Sept. 1, 1936.  J. E. ROBINSON  2,052,582
SEALING GASKET
Filed Oct. 28, 1933

INVENTOR
John E. Robinson
BY Ivan O. Thornburgh
Charles H. Cone
ATTORNEYS

Patented Sept. 1, 1936

2,052,582

UNITED STATES PATENT OFFICE 2,052,582

SEALING GASKET

John E. Robinson, Glen Ellyn, Ill., assignor to American Can Company, New York, N. Y., a corporation of New Jersey Application October 28, 1933, Serial No. 695,715

12 Claims. (Cl. 91—68)

The present invention relates to sealing gaskets for interlocked seams and has more particular reference to the method of producing can sealing gaskets consisting basically of a mixture of rubber and fibrous materials intermingled in dry form, an capable of being dissolved in a liquid for application to a surface to be incorporated in the can seam.

The invention contemplates certain steps in procedure for producing sealing gaskets of rubber and fibrous material, such as paper, which are capable of swelling just the desired amount and not too quickly when brought into contact with liquids such as liquid contents of cans in which the gaskets are used and during sealing of the same. Gaskets made according to the method invention have the desired plasticity for flowing into and filling the voids in the formation of can seams as made, for example by seaming rollers, being not as plastic as a rubber gasket and more plastic than a paper gasket.

Such improved gaskets also have a better cushioning effect in the seam closing operation; they have a longer effective life for the purposes intended, that is, as sealing gaskets; they have greater adaptability to varying can seam problems, and other desirable characteristics not found in ordinary gaskets.

An object of the present invention is the provision of a method of uniting dry pulverized fibrous material and dry rubber in a homogeneous mass to produce a gasket stock and depositing the stock uniformly on a surface by first dissolving into liquid form and then flowing the liquid in proper place.

The invention contemplates the milling, which I call dry milling, working or kneading together, of dry rubber and pulverized paper to produce a plastic dry mixture for gasket stock having an intimate relationship between rubber and paper and one which may be dissolved in a suitable liquid to provide a solution of homogeneous character wherein the solid particles are so fine and thoroughly dispersed as to produce practically a nonsettling solution for the purpose of applying to the desired surface.

A further object of the invention is the provision of a method of working together sheet rubber and pulverized paper to produce a uniformly mixed gasket stock of rubberized fibre particles or fiberized rubber elements which is capable of application to a can surface when dissolved in a volatile liquid vehicle, the liquid being then driven off of the deposited solution by drying, leaving only the solids as a gasket.

Numerous other objects and advantages of the invention will be apparent as it is better understood from the following description, which, taken in connection with the accompanying drawing, discloses a preferred embodiment thereof.

Referring to the drawing.

Figure 1:
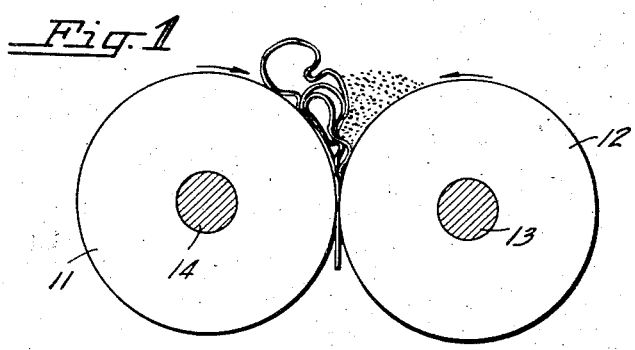
Figure 1 is a diagrammatic view of a pair of milling rollers illustrating the step of milling the rubber and paper together.

In carrying out the steps of the present invention a fibrous material is completely incorporated in dry rubber by milling, or in other suitable manner, so that rubber and fibre are thoroughly broken up into minute individual elements and the fibre particles are coated or intermingled with the rubber. This provides a plastic material which is homogeneous and which is capable of storage in the dry form if desired. For some purposes it is also desirable to further add suitable metal oxides, this being done preferably at the time of milling and at the time the dry plastic stock is produced.

This dry material, when it is to be converted into sealing gaskets, is first dissolved and thoroughly mixed in a liquid vehicle such as benzol. This may then be applied to the surfaces where needed. This is done in a uniform manner as by flowing through a discharge nozzle of the usual can end lining machine.

The can part or other surface containing the deposited material is then dried in any suitable manner as by heat and the liquid vehicle is driven off by evaporation so as to leave a uniformly deposited gasket. This gasket adheres to the surface of the can part and when incorporated in a can seam provides a hermetically sealed joint, the gasket flowing into and filling the voids in the seam, any liquid coming into contact with it at such time rather increasing its sealing action.

In the diagrammatic views of the drawing are set forth the principal steps of the instant invention and brief reference will now be made to this showing in describing one satisfactory way of providing the improved sealing gasket.

In providing the dry gasket stock referred to, rubber in the dry form is used. A sheet form of rubber as received from the rubber manufacturer is satisfactory and may be crepe rubber or smoked sheets, or smoked and ribbed sheets. This rubber is put into an ordinary milling or other suitable form of machine capable of working or kneading the rubber so as to render it plastic. One such form of milling machine is illustrated in Figure 1 and comprises milling rollers 11, 12 rotated in opposite directions on or with parallel shafts 13, 14. The rubber is passed again and again through the rolls until it is plastic and slightly tacky.

Fibrous material such as wood pulp or paper fibre which has preferably been thoroughly pulverized is added to the plastic rubber and is gradually worked into the rubber by continuous milling until the resultant mass is homogeneous and the two materials are thoroughly mixed. This provides a gasket stock of closely knit sheet form which is removed from the milling machine and if desired stored for future needs. This forms what is herein referred to as the gasket stock.

For some purposes other materials are added to the rubber and paper during the milling operation and considerable latitude of texture is possible in the gasket stock by the selection of these other materials and by varying the quantities added. These materials are usually metallic oxides and act in a sense as fillers affecting the elasticity and plastic character of the stock. Zinc, aluminum, iron and titanium oxides have been found satisfactory for gaskets used for sealing cans of various food products. The addition of a suitable antioxidant may be made at this point if desired to improve ageing characteristics.

Figure 2:
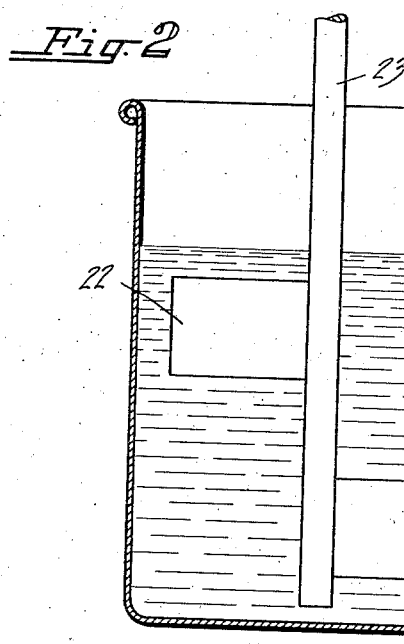
Fig. 2 is a diagrammatic view of a mixing tank illustrating the step of dissolving or incorporating the gasket stock in a soluble liquid.

In forming gaskets this gasket stock is dissolved in a liquid vehicle such as benzol by being introduced into the vehicle and thoroughly stirred until a uniformly distributed liquid material results. Figure 2 illustrates in bare outlines a tank in which benzol or other suitable material is placed. Some manner of stirring is provided such as paddles 22 carried on a rotating shaft 23.

Figure 3:
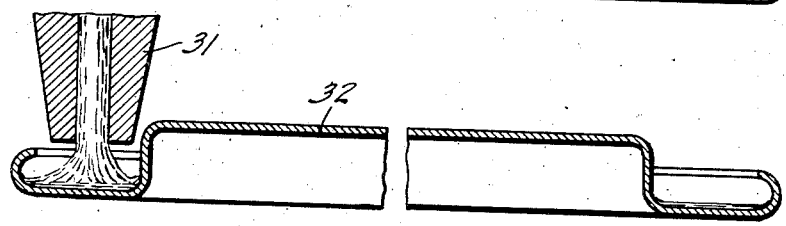
Fig. 3 is a diagrammatic view of a part of a lining machine and illustrating the deposit of gasket solution on a can part.

The gasket stock is first broken up in small pieces and these pieces are fed into the tank 21 where they are stirred in the liquid benzol. The rubber in the stock dissolves and the fibre with any other additional materials is thoroughly dispersed in the solution. The individual particles of fiberized rubber or rubberized fibre are so minute and the action of the benzol is so complete as a dissolving agent that the resulting liquid is entirely homogeneous and in large part the solid materials remain in suspension without any decided tendency of settling. The resulting liquid may then be removed from the tank 21 and may be run through a discharge nozzle 31 (Fig. 3) of an ordinary compound lining machine in which a can end, designated by the numeral 32, is rotated below the nozzle or the nozzle is carried around the lining channel of the can end in the regular manner. In this way, the flange of the can end if an end is used, or any other suitable part of the can to be gasket lined, is thoroughly and uniformly coated with the liquid mixture.

These can ends are then dried in any suitable manner, the usual drying by heat being entirely satisfactory. The volatile benzol or other vehicle is completely evaporated and the deposited gasket on the flange of the can end is dried and then contains only the solid elements. This gasket consists of a thoroughly uniformly mixed mass of fibre and rubber or if oxides have been added a mixture of whatever solids are present. This gasket adheres to the coated surface and, in the case of a can end, is in condition for incorporation into a can seam.

The percentage of rubber and paper may be varied as desired, a fifty-fifty combination being found desirable for lining can seams. The thickness of the gasket after drying will vary in accordance with the amount of solution deposited upon the can end flange during the lining.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of producing sealing gaskets which comprises, milling pulverized fibrous material and dry rubber into an intimate homogeneous mass and thereby providing a gasket composition in which the individual fibers are waterproofed and minute spaces are reduced, dissolving said mass in a liquid vehicle to form a mixture of fluid consistency, depositing said mixture on a surface to be provided with a gasket, and drying said mixture to drive off the vehicle and leave a dry gasket on said surface.

2. The method of producing sealing gaskets which comprises, milling pulverized fibrous material and sheet rubber in a dry state into an intimate homogeneous mass, dissolving said mass in a liquid vehicle to provide a mixture of fluid consistency capable of uniform application to a surface, and driving off said volatile vehicle from said deposited mixture to leave the solids as a dry gasket.

3. The method of producing sealing gaskets which comprises, uniting pulverized fibrous material and sheet rubber in a dry state into an homogeneous mass by milling the two together, and thereby providing a gasket composition in which the individual fibers are waterproofed and minute spaces are reduced, dissolving said mass in a volatile liquid vehicle to form a fluid mixture of relatively thin consistency capable of uniform application to a surface, and driving off said volatile vehicle after deposit to leave a dry solid gasket on said surface.

4. The method of producing sealing gaskets which comprises, milling pulverized fibrous material and dry rubber together to form an intimate homogeneous mass of fiberized rubber and thereby providing a gasket composition in which the individual fibers are waterproofed and minute spaces are reduced, dissolving said mass in a liquid vehicle and thoroughly mixing to form a fiberized rubber mixture of fluid consistency, depositing said mixture as a uniform layer on a surface to be provided with a gasket, and drying said deposited layer to drive off the liquid vehicle and leave a dry solid gasket on said surface.

5. The method of producing sealing gaskets for can seams, which comprises thoroughly milling pulverized fibrous material and plastic rubber in a dry state together to produce a sheet of gasket stock in which the rubber is combined with the fibrous material, dissolving and mixing said stock in a volatile liquid vehicle to produce a lining material of fluid consistency, depositing said material on a surface to be provided with a gasket, and vaporizing said volatile vehicle from said deposited solution to leave a dry sealing gasket resistant to water on said surface.

6. The method of producing sealing gaskets for can seams, which comprises milling sheet rubber to render it plastic, incorporating during milling pulverized fibrous material into said plastic rubber to produce a uniform sheet of gasket stock in which the rubber is combined with the comminuted fibrous material, breaking up said sheet and dissolving it in a volatile liquid vehicle to provide a lining material of fluid consistency, applying said material to a can part, and vaporizing said liquid vehicle to leave a dry sealing gasket resistant to water on said part.

7. The method of producing sealing gaskets for can seams, which comprises thoroughly milling pulverized fibrous material, rubber and zinc oxide together to produce a gasket stock in which the rubber is intimately combined with the fibrous material, dissolving said stock in a volatile liquid vehicle to produce a liquid mixture, applying said mixture to a can part to be sealed, and vaporizing said volatile vehicle to leave a dry sealing gasket resistant to water on said can part.

8. The method of producing sealing gaskets for can seams, which comprises thoroughly milling sheet rubber, pulverized fibrous material and aluminum oxide together in a dry state to produce a gasket stock in which the rubber is intimately combined with the fibrous material, dissolving said stock in a volatile liquid vehicle to produce a liquid mixture, applying said mixture to a can part to be sealed, and vaporizing said liquid vehicle to leave a dry sealing gasket resistant to water on said can part.

9. The method of producing sealing gaskets for can seams, which comprises intimately incorporating pulverized paper stock, iron oxide and dry sheet rubber together by milling with exclusion of liquid, dissolving said milled mixture in a volatile liquid vehicle to form a mixture of fluid consistency capable of uniform application to a surface to be sealed, applying said fluid mixture uniformly to said surface, and drying said applied mixture to leave a solid gasket on said surface.

10. The method of producing sealing gaskets, which comprises dry milling pulverized paper, sheet rubber and titanium oxide together to produce a homogeneous dry mass in which the rubber is intimately combined with the paper, dissolving said mass in a liquid vehicle to form a mixture of fluid consistency, depositing said mixture on a can surface to be sealed and driving off said liquid vehicle by drying the said mixture to leave a deposited dry gasket resistant to water on said surface.

11. The method of producing sealing gaskets for can seams, which comprises thoroughly working sheet rubber by a dry milling operation to render it plastic, combining pulverized paper stock with said plastic rubber during milling to produce a uniform, dry, adherent mixture in which the rubber is intimately combined with the pulverized paper, dissolving said dry mixture in benzol to provide a liquid mixture capable of uniform application to a surface to be sealed, applying the liquid mixture to said surface, and driving off said benzol by evaporation to leave a deposited dry sealing gasket resistant to water on said surface.

12. The method of producing sealing gaskets for can seams, which comprises milling pulverized fibrous material and plastic rubber in a dry state together to produce a gasket stock in which the rubber is intimately combined with the pulverized fibrous material, dissolving said stock in a volatile liquid to produce a liquid lining material, applying said liquid material to a can part to be sealed and then vaporizing said volatile material to leave a dry sealing gasket resistant to water on said can part.

JOHN E. ROBINSON.